United States Patent [19]

Duncan et al.

[11] Patent Number: 5,132,531

[45] Date of Patent: Jul. 21, 1992

[54] TRANSLATIONAL POSITION SENSING APPARATUS EMPLOYING ROTATING ELEMENT AND PSD

[75] Inventors: Eugene F. Duncan, Wauwatosa; Gregory L. Nadolski, Brookfield, both of Wis.

[73] Assignee: Eaton Corporation, Cleveland, Ohio

[21] Appl. No.: 609,866

[22] Filed: Nov. 7, 1990

[51] Int. Cl.⁵ ............................................. G01D 5/34
[52] U.S. Cl. .......................... 250/231.13; 250/211 K; 250/229
[58] Field of Search .............. 250/229, 231.1, 231.13, 250/231.19, 561, 231.11, 211 K; 356/373; 73/800, 705

[56] References Cited

U.S. PATENT DOCUMENTS

| | | | |
|---|---|---|---|
| 3,624,404 | 11/1971 | Hines | 250/231.1 |
| 3,826,487 | 7/1974 | Forster et al. | 271/263 |
| 3,968,364 | 7/1976 | Miller | 250/231.1 |
| 3,987,338 | 10/1976 | Puetz | 250/231.1 |
| 4,122,337 | 10/1978 | Okuda et al. | 250/211 K |
| 4,771,640 | 9/1988 | Matsuura | 250/231.1 |
| 4,785,189 | 11/1988 | Dietrich et al. | 250/229 |
| 4,831,253 | 5/1989 | Omura et al. | 250/229 |
| 4,888,491 | 12/1989 | Kobayashi et al. | 250/561 |
| 4,937,460 | 6/1990 | Duncan et al. | 250/561 |
| 4,938,062 | 7/1990 | Shimizu et al. | 73/705 |

*Primary Examiner*—David C. Nelms
*Assistant Examiner*—Michael Messinger
*Attorney, Agent, or Firm*—L. H. Uthoff, Jr.

[57] ABSTRACT

An optoelectronic position-sensitive detector (PSD) is disposed within a protective housing. An operator is movably mounted to the housing to be mechanically displaced by an object whose position is being sensed. A light projector within the housing is moved in response to operator movement to move a narrow light beam along a surface of the PSD corresponding to the position of the operator. A control system receives signals from the two output terminals of the PSD, compares and processes the same and produces a single analog signal indicative of the position of the object. The operator may be axially reciprocally movable or rotatable, and may have direct or indirect coupling with the light projector.

3 Claims, 1 Drawing Sheet

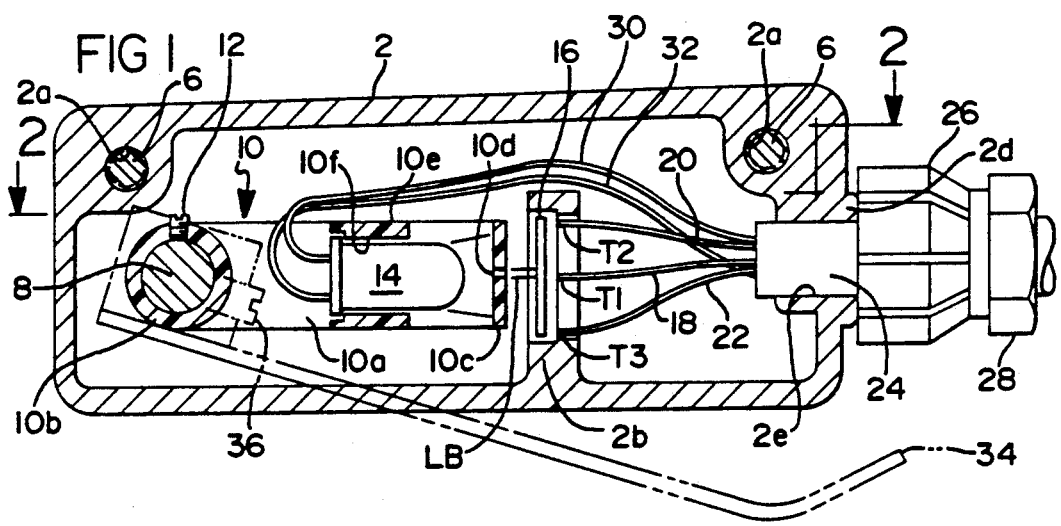
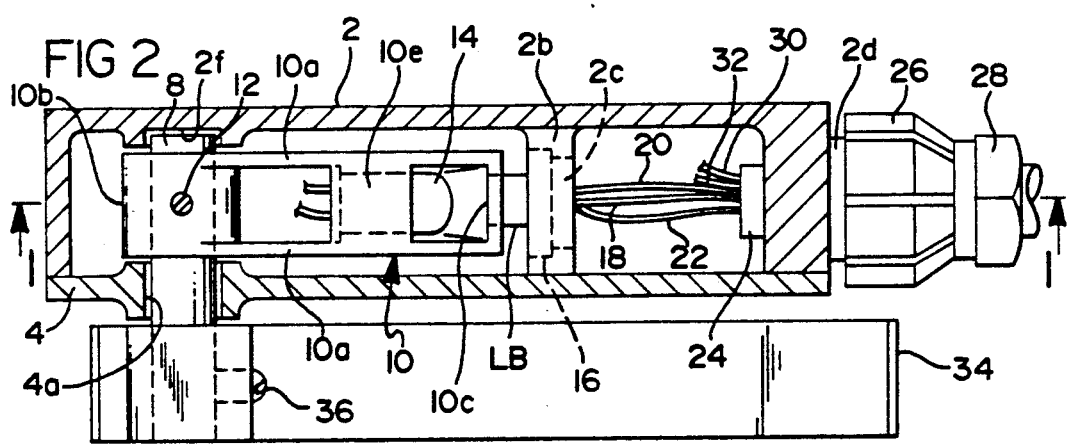
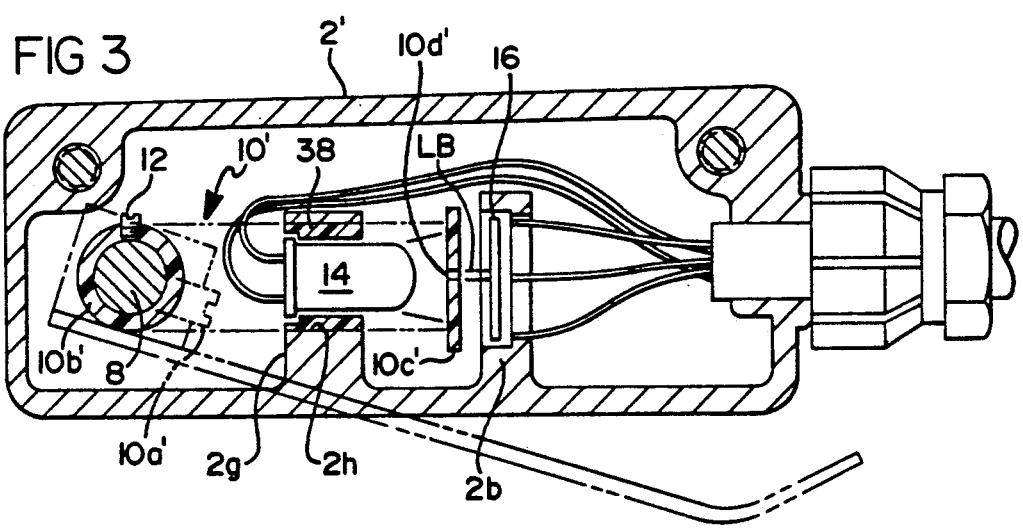

TRANSLATIONAL POSITION SENSING APPARATUS EMPLOYING ROTATING ELEMENT AND PSD

BACKGROUND OF THE INVENTION

This invention relates to apparatus for sensing the position of an object movable along a prescribed path within limited boundaries. More particularly, this invention relates to apparatus of the aforementioned type wherein an optoelectronic position-sensitive detector (PSD) and a light source are disposed within a housing, the light source providing a light beam directed onto the PSD and movable in response to movement of a mechanical operator extending through the housing to be in contact with the object.

In industrial control applications, it is often desirable to monitor excursions of an object or objects from a normal path or position. Such monitoring is commonly accomplished with photoelectric, ultrasonic or electromagnetic proximity sensors operating in a non-contact mode with the object. However, some industrial process control environments are not well suited for such sensors because they contain a large amount of pollutants or contaminants or electrical noise. In such applications, and where the objects are capable of withstanding physical contact by a sensor, an enclosed switching apparatus having a mechanical operator in contact with the objects can be utilized. Photoelectric switches and photodiode arrays have been utilized within such devices to provide a hybrid mechanical-photoelectric sensor. The photoelectric switch is a digital device which does not lend itself to applications desiring to continuously monitor a changing position. Photodiodes or phototransistors may be used, but the range in output signals for these devices from fully illuminated to fully blocked is objectionably small. Photodiode arrays have been used, but these detectors require a costly multiplexing circuit inasmuch as the individual diodes are sequentially read and their outputs are related to a timing sequence in the multiplexing circuit.

While the sensors described hereinbefore are each suitable for particular applications, this invention relates to improvements thereover.

SUMMARY OF THE INVENTION

This invention provides position sensing apparatus of the mechanical/photoelectric type utilizing an optoelectronic position-sensitive detector (PSD) within an enclosure and a movable operator in contact with an object or objects, moved by the object(s) to effect corresponding movement within the enclosure of a light beam directed on the PSD. Operator movement may effect movement of a light source within the enclosure to move a directed light beam along the PSD or the light source may be fixed and a shield having an aperture for directing a light beam therethrough may be moved in response to operator movement. The PSD provides strong stable output signals which are readily used by electrical industrial control apparatus. The invention, its features and advantages, will become readily apparent in the following specification and claims when read in conjunction with the accompanying drawings.

BRIEF DESCRIPTION OF THE DRAWINGS

FIG. 1 is a cross sectional view of the position sensing apparatus of this invention taken generally along the line 1—1 in FIG. 2;

FIG. 2 is a cross sectional view of the position sensing apparatus of this invention taken generally along the line 2—2 in FIG. 1; and FIG. 3 is a cross sectional view similar to FIG. 1 but illustrating a modified embodiment.

DETAILED DESCRIPTION OF THE PREFERRED EMBODIMENT

The position sensing apparatus of this invention comprises an elongated shallow housing 2 open along a major side thereof. A cover 4 is disposed over the open side of housing 2 and secured thereto by screws 6 which pass through clearance holes (not shown) in cover 4 and threadably engage tapped holes 20 in housing 2. A stub wall 2b is provided internally of housing 2, the wall 2b having a shouldered opening 2c extending therethrough. Housing 2 also has a threaded boss 2d (only partially shown) extending from the right-hand end wall thereof and a hole 2e extending through the boss 2d and end wall of the housing.

A shaft 8 extends through a hole 4a in cover 4 and is rotatably journaled within the hole 4a and a bearing recess 2f in housing 2. A light projector member 10 is fixed to shaft 8 within the enclosure provided by housing 2 and cover 4 by a set screw 12. Light projector 10 is preferably molded of a plastic electrical insulating material and comprises a pair of side portions 10a separated at one end by a cylindrical hub portion 10b which surrounds shaft 8 and by a shield portion 10c having a narrow aperture 10d at the other end of the member. A transverse web 10e is disposed intermediate cylindrical hub 10b and shield 10c. Web 10e has a shouldered opening 10f extending therethrough for receiving a light source element such as a light emitting diode (LED) 14. The LED 14 is directed to illuminate the adjacent or inside surface of shield 10c, thereby projecting a narrow beam of light LB through the aperture 10d.

An optoelectronic position-sensitive detector (PSD) 16 is disposed within the shouldered opening 2c, secured firmly against the shoulder within that opening by an adhesive, epoxy or other suitable securing means. The photosensitive surface of PSD 16 is arranged to face the shield 10c and receive light beam LB thereon. Electrodes T1, T2 and T3 of PSD 16 are connected through wire conductors 18, 20 and 22 of a cable 24 extending through opening 2e in housing 2. A connector 26 is threaded onto boss 2d and secured thereto by a nut 28. Cable 24 also has a pair of wire conductors 30 and 32 which are connected to the LED 14.

A lever arm 34 is fixed to the external projecting end of shaft 8 by a set screw 36. The distal end of lever arm 34 is arranged to be engagable with an object whose position is to be monitored. Deviation of the object from its intended position will effect pivotal movement of lever arm 34 and rotary motion of shaft 8 which in turn causes corresponding pivotal movement of light projector member 10 within the housing. Movement of projector member 10 causes light beam LB to move along the surface of PSD 16, resulting in a variation of output signals at the terminals T2 and T3 of PSD 16. Position-sensitive detectors such as PSD 16 operate in response to light impinging the photoresponsive surface to generate photocurrents at the respective terminals T2 and T3 which are inversely proportional to the distance from the respective terminal to the point at which light impinges the surface. These signals are fed to a control system such as that disclosed in U.S. Pat. No. 4,937,460 issued Jun. 26, 1990 to E. F. Duncan et al and assigned to the assignee of this invention, which patent is incorporated herein by reference. The control system compares the signals and produces a single analog output signal which is used to indicate the position of the object with respect to its intended position.

The position sensing apparatus as described hereinabove provides an optoelectronic PSD in apparatus designed for industrial control environment. Although the apparatus as described hereinbefore represents the best mode contemplated plated of practicing the invention, other embodiments and modifications are also contemplated. A particular modification contemplated herein is shown in FIG. 3, wherein the LED light source 14 is fixed within a modified housing 2' and the light shield 10c' is movable to redirect light beam LB through aperture 10d' along the surface of PSD 16. As seen in FIG. 3, housing 2' is provided with a second stub wall 2g having a hole 2h therethrough. A shouldered insulating bushing 38 is fixed within hole 2h to receive LED 14. A modified projector member 10' has only one side portion 10a', that being on the side adjacent cover 4 and shown in broken lines in FIG. 3. Shield 10c' extends transversely from the distal end of side portion 10a'. Shield 10c' is made larger than shield 10c in the vertical plane as viewed in FIG. 3 to prevent light of LED 14 from impinging PSD 16 around the upper or lower edges of shield 10c' when the shield is pivoted to an extreme position.

It is further contemplated that other light sources may be used which direct or project a narrow light beam. Moreover, shaft 8 may be directly or indirectly coupled to an object whose rotational position is to be monitored as opposed to utilizing the lever arm operator. Still another contemplated embodiment is to provide an axially reciprocally movable shaft or bar operator which would engage and be responsive to positions of an object and provide appropriate linear movement of the shield or light source within the housing. It is to be understood that the position sensing apparatus as described herein is susceptible of these and various other modifications without departing from the scope of the appended claims.

We claim:

1. A translational position sensor employing a rotating element comprising:
    a housing:
    a shaft rotatably journaled in said housing and extending through an exterior wall of said housing;
    a lever arm with a first end attached to said shaft and a second end having a curved section contacting a surface whose position is to be measured;
    a projector member movably mounted within said housing and nonrotatably mounted to said shaft, said projection member having an end plate having an aperture;
    a position-sensitive detector (PSD) within said housing opposite said aperture;
    a light source mounted on said housing and positioned to project a beam of light through said aperture and onto said PSD to cause said beam of light to traverse said PSD corresponding to positions of said lever arm.

2. The translational position sensor employing a rotating element of claim 1, wherein said light source is a light emitting diode.

3. The translational position sensor employing a rotating element of claim 1, wherein said first end of said lever arm is attached to said shaft with a collar and retained with a set screw.

* * * * *